US012560420B2

(12) United States Patent
Samson

(10) Patent No.: US 12,560,420 B2
(45) Date of Patent: Feb. 24, 2026

(54) FISH TAPE FOR USE IN A SYSTEM FOR INSTALLING REFRIGERANT

(71) Applicant: Trent Samson, Menifee, CA (US)

(72) Inventor: Trent Samson, Menifee, CA (US)

( * ) Notice: Subject to any disclaimer, the term of this patent is extended or adjusted under 35 U.S.C. 154(b) by 314 days.

(21) Appl. No.: 18/373,141

(22) Filed: Sep. 26, 2023

(65) Prior Publication Data

US 2025/0102282 A1     Mar. 27, 2025

(51) Int. Cl.
*G01B 3/1084* (2020.01)
*F25B 45/00* (2006.01)

(52) U.S. Cl.
CPC ............ *G01B 3/1084* (2013.01); *F25B 45/00* (2013.01)

(58) Field of Classification Search
CPC ..... G01B 3/1084; F25B 45/00; F25B 2345/00
See application file for complete search history.

(56) References Cited

U.S. PATENT DOCUMENTS

| | | | | | |
|---|---|---|---|---|---|
| 2,035,379 | A | * | 3/1936 | Stewart | G01B 3/1084 242/396.5 |
| 2,718,376 | A | * | 9/1955 | Raney | H02G 1/085 33/732 |
| 3,255,531 | A | * | 6/1966 | Anderson | G01B 3/1041 242/405 |
| 3,528,644 | A | * | 9/1970 | Scott | B65H 75/406 254/134.3 R |
| 4,092,780 | A | * | 6/1978 | Trethewey | G01B 3/11 254/134.3 FT |
| 4,521,934 | A | * | 6/1985 | Castle | A47L 13/08 30/124 |
| 5,110,092 | A | * | 5/1992 | Blaha | B65H 75/18 254/134.3 FT |
| D351,561 | S | * | 10/1994 | Moffatt | D10/72 |
| 5,423,516 | A | * | 6/1995 | Blaha | B65H 75/406 254/134.3 FT |
| 5,588,220 | A | * | 12/1996 | Cousins | G01B 3/1084 33/761 |
| 5,647,135 | A | * | 7/1997 | Fuentes | B43L 13/022 33/483 |
| 8,899,554 | B2 | * | 12/2014 | Wong | G01B 3/10 33/759 |
| 9,846,021 | B2 | * | 12/2017 | Zelenack, Jr. | G01B 3/1084 |
| 10,012,489 | B2 | * | 7/2018 | Hoppe | G01B 3/1041 |
| 10,260,852 | B2 | * | 4/2019 | Zelenack, Jr. | G01B 3/1084 |
| 10,767,971 | B2 | * | 9/2020 | Zelenack, Jr. | G01B 3/1041 |
| 10,859,364 | B1 | * | 12/2020 | Nelson | G01B 3/1048 |
| 2001/0029676 | A1 | * | 10/2001 | Biglin | G01B 3/02 33/549 |
| 2003/0192193 | A1 | * | 10/2003 | Potts | H02G 1/085 33/759 |
| 2007/0187659 | A1 | * | 8/2007 | Wiesemann | B65H 75/406 254/134.3 FT |

(Continued)

*Primary Examiner* — Yaritza Guadalupe-McCall
(74) *Attorney, Agent, or Firm* — The Buche Law Firm, P.C.; Bryce A. Johnson; John K. Buche

(57) ABSTRACT

Disclosed is an improved fish tape and housing. Generally, the disclosed fish tape and housing includes: a modified and scaled fiberglass, metallic or plastic tape designed for accurately measuring the total length of round pipes; a modified tip for the tape that prevents damage to copper piping of a refrigerant piping system; and a housing containing the tape such that the tape is extractable from the housing and wherein the housing includes squeegee that wipes clean the tape as it is extracted from the housing.

8 Claims, 8 Drawing Sheets

(56)                    References Cited

U.S. PATENT DOCUMENTS

| | | | | |
|---|---|---|---|---|
| 2007/0256314 A1* | 11/2007 | Ruiz | .................... | G01B 3/1084 |
| | | | | 33/759 |
| 2009/0159862 A1* | 6/2009 | Wong | ....................... | G01B 3/10 |
| | | | | 254/134.3 FT |
| 2012/0036727 A1* | 2/2012 | McCarthy | ............ | G01B 3/1003 |
| | | | | 33/760 |
| 2018/0120075 A1* | 5/2018 | Zelenack, Jr. | ....... | G01B 3/1084 |
| 2024/0359945 A1* | 10/2024 | Solar | ...................... | B65H 61/00 |
| 2025/0052555 A1* | 2/2025 | Kong | .................... | H02G 1/083 |
| 2025/0102282 A1* | 3/2025 | Samson | .............. | G01B 3/1084 |

* cited by examiner

FORMULA #1
FORMULA #2
FORMULA #3
FORMULA #4
FORMULA #5

FISH TAPE FOR USE IN A SYSTEM FOR INSTALLING REFRIGERANT

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of air conditioning and refrigeration systems.

Background of the Invention

HVAC (Heating, Ventilation, and Air Conditioning) technicians are responsible for ensuring that new or existing HVAC systems function efficiently and effectively. Central to this responsibility is the management of refrigerant, for example "freon," in these systems. Refrigerant is responsible for cooling and heat exchange processes.

One typical scenario HVAC technicians encounter is working with preexisting refrigerant piping systems, e.g., when retrofitting an older system, repairing a leak, or simply performing regular maintenance. In this scenario, technicians often face the challenge of determining precisely how much refrigerant should be charged (i.e., added) to the system. Accurate refrigerant charging is paramount to the proper HVAC functions. Insufficient or excessive refrigerant levels can lead to poor performance, increased energy consumption, and equipment damage.

Traditionally, HVAC technicians rely on a variety of systems or methods to measure and introduce refrigerant into systems. These tools often include rulers, common measuring tapes, gauges, and cylinders. However, when it comes to retrofitting or servicing existing systems, these methods can pose a significant problem.

There are several problems associated with traditional systems/methods. One problem is that refrigerant piping can be inaccessible or have obstructed access because measuring the length of the copper piping becomes difficult or impossible. Another problem is ensuring the cleanliness of the tools used for measuring and adding refrigerant. Contaminants, moisture, or residues left on these tools can compromise the integrity of the refrigerant and the overall efficiency of the HVAC system. Furthermore, many rulers or measuring tapes and tools are not designed with the specific needs of HVAC technicians in mind. These may lack precision, ease of use, or compatibility with refrigerant installation procedures.

Description of Related Art

Here is a list of related art that has one or more of the problems identified above:

U.S. Des. Pat. No. 351,561 by Wu (circa 2006) discloses a "DRAIN CLEANER STRIP"

U.S. Des. Pat. No. 518,252 by Moffatt et al. (circa 1994) discloses a "FISH TAPE CASING"

U.S. Pat. No. 8,584,297 by Tash (circa 2013) discloses a "HAND-OPERATED DRAIN SNAKE WITH AUGER."

U.S. Pat. No. 7,415,778 by McEwan et al. (circa 2008) discloses a "TAPE MEASURE WITH MOVING TAPE EXIT PORT."

U.S. Pat. No. 6,224,038 by Walstent et al (circa 2001) discloses a "FISH TAPE REEL ASSEMBLY."

U.S. Pat. No. 4,092,780 by Trenthewey et al. (circa 1978) discloses a "ELECTRICIAN'S FISH TAPE." According to this patent's abstract, the "fish tape and reel and spreader mechanism . . . includes a handle and a counter device so that the length of the tape payed out will be measured."

U.S. Pat. No. 2,764,294 by Johnson (circa 1956) discloses "ATTACHMENTS FOR DIP-STICKS."

U.S. Pat. No. 2,743,884 by Briggs (circa 1953) discloses "FISH TAPE THREADER."

U.S. Pat. No. 1,858,997 by Lewin (circa 1932) discloses "SPIRAL FISH CABLE."

US20070256314A1 by Ruiz (circa 2007) disclose a "MEASURED STEEL FISH TAPE." The abstract explains that the "steel fish tape . . . is functional and time-and money-saving. The original wide, flat form of the fish tape allows for imprinted measurements, thereby enabling the measurement imprints to start at one (1) and reach up to the length of the fish tape, including every inch in between each foot."

US20050126029A1 by Smith (circa 2005) discloses a "TAPE MEASURE DEVICE."

US20050011082A1 by Bautista et al (circa 2005) discloses a "WIRE MEASURING SYSTEM." The abstract says:

"A wire measuring system include[es] a housing having a handle secured thereto. The housing has a hollow interior including an exit slot formed therein. A length of tape is disposed within the hollow interior of the housing. The length of tape has incremental measurements imprinted thereon. Then length of the tape has a free end extending outwardly of the exit slot of the housing. A tip portion is swively coupled with the free end of the length of tape. The tip portion has a slot formed therethrough for receiving a free end of a length of wire therethrough.

US20030192193A1 by Potts et al. (circa 2003) discloses "MEASURING FISHTAPE."[003] of the document says: "the metal tape has measuring marks in the instruments of inches and feet marking to the end of the metal tape." [005] says: "The measuring fish tape is used for measuring the conduit or flex to get and exact measurement of the conduit, so that the electrician can cut the exact amount of wire that he needs."

KR101165404B1 discloses a dip stick rope for measuring the depth of a fluid.

SUMMARY OF THE INVENTION

In view of the foregoing, there is a clear need for innovative solutions that simplify the process of measuring and introducing refrigerant into preexisting HVAC systems. Such solutions should not only enhance accuracy but also prioritize the cleanliness and integrity of the refrigerant. Addressing these challenges can improve the efficiency of HVAC systems, reduce environmental impact, and enhance the overall experience for HVAC technicians and their clients.

In this context, the disclosed improvement to systems and methods of HVAC installation seeks to revolutionize the way HVAC technicians approach refrigerant measurement and installation in preexisting systems. This improvement combines practicality, precision, and cleanliness to offer a solution that aligns with the evolving needs of the HVAC industry. By addressing these challenges, this improvement aims to elevate the standard of HVAC system maintenance, ensuring that refrigeration systems operate at their best.

Generally speaking, disclosed is an improved fish tape and housing comprising: a modified and scaled fiberglass tape designed for accurately measuring the total length of round pipes; a modified tip for the tape that prevents damage to copper piping of a refrigerant piping system; and a housing containing the tape such that the tape is extractable from the housing and wherein the housing includes squeegee that wipes clean the tape as it is extracted from the housing. A preferred method of using the above described fish tape could include: locating the fish tape, with its built-in measuring tape and squeegee; locating the piping system where the refrigerant needs to be installed; pulling the fish tape from the housing such that the squeegee wipes the tape clean and free of contaminants; inserting the tip of the fish tape into an end of the piping system such that the pipe is not damaged; threading the Fish Tape through the piping system via slowly feeding the fish tape into the piping, pushing it further into the system wherein the squeegee on the tape housing continues to remove any debris or contaminants from the exterior of the tape as the tape is extracted from the housing and advanced into the piping system; pulling the tip from the end of the piping system; measuring the Length displayed on the tape at the entrance of the piping system such that the measurement corresponds to the length of the piping system; noting the length of the system; retrieving the fish tape via retraction from the system and reentry of the tape into the housing after being squeegeed for contaminants; calculating a refrigerant amount needed for the system via formulas, established guidelines or charts, taking into account the type and size of the refrigerant line; and, charging the system via adding the calculated amount of refrigerant to the system through the appropriate access point, ensuring that the refrigerant is introduced accurately and safely; and verifying or testing the system to ensure that it is operating correctly and that it meets the desired performance standards.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Disclosed is an improved fish tape and housing. Generally, the disclosed fish tape and housing includes: a modified and scaled fiberglass, metallic or plastic tape designed for accurately measuring the total length of round pipes; a modified tip for the tape that prevents damage to copper piping of a refrigerant piping system; and a housing containing the tape such that the tape is extractable from the housing and wherein the housing includes squeegee that wipes clean the tape as it is extracted from the housing. The more specific details of this disclosure are described with reference to the attached FIGURES.

Figure 1:
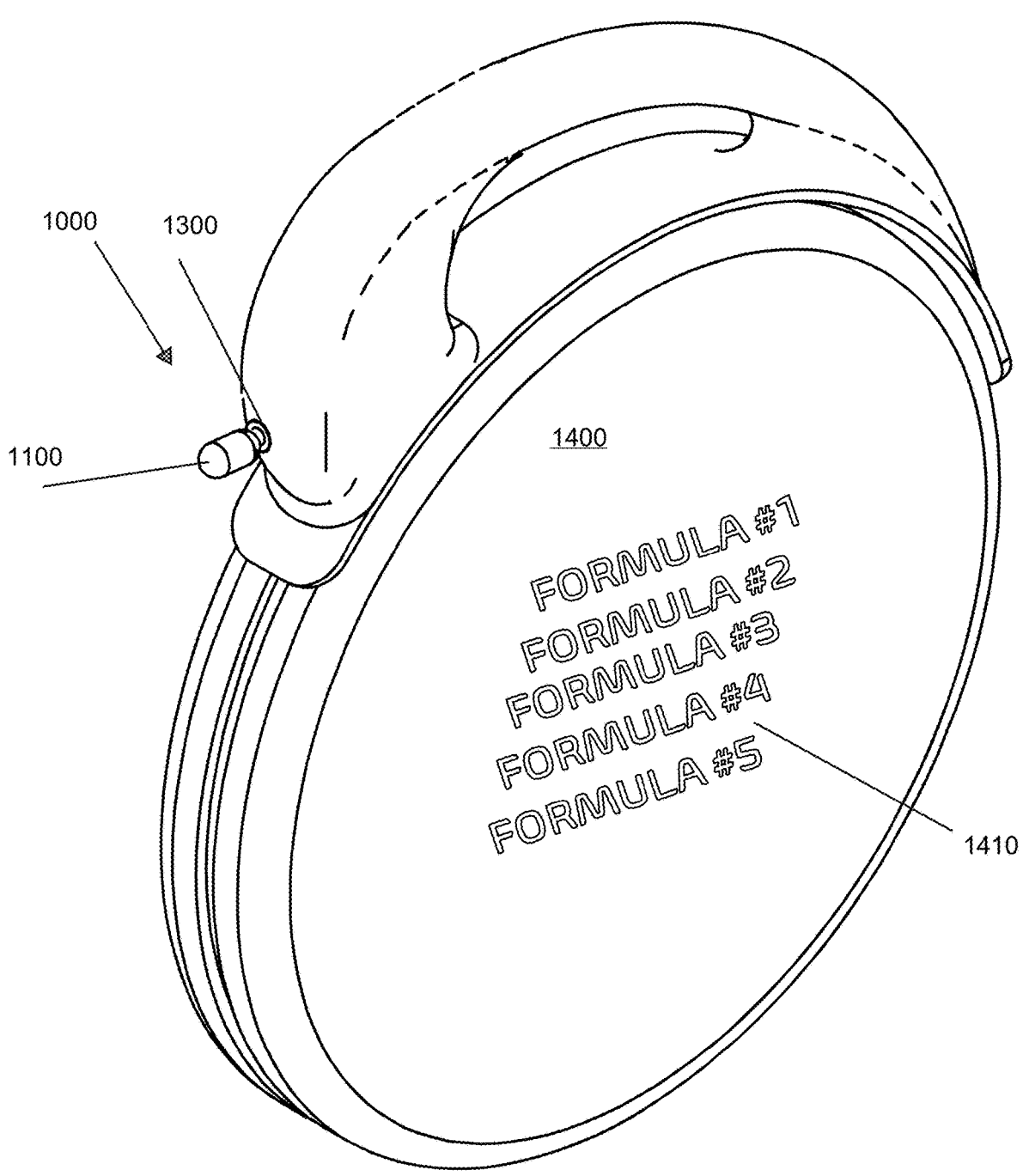
FIG. 1 is a perspective view of an improved fish tape 1000'.
Figures 2, 3, 4:
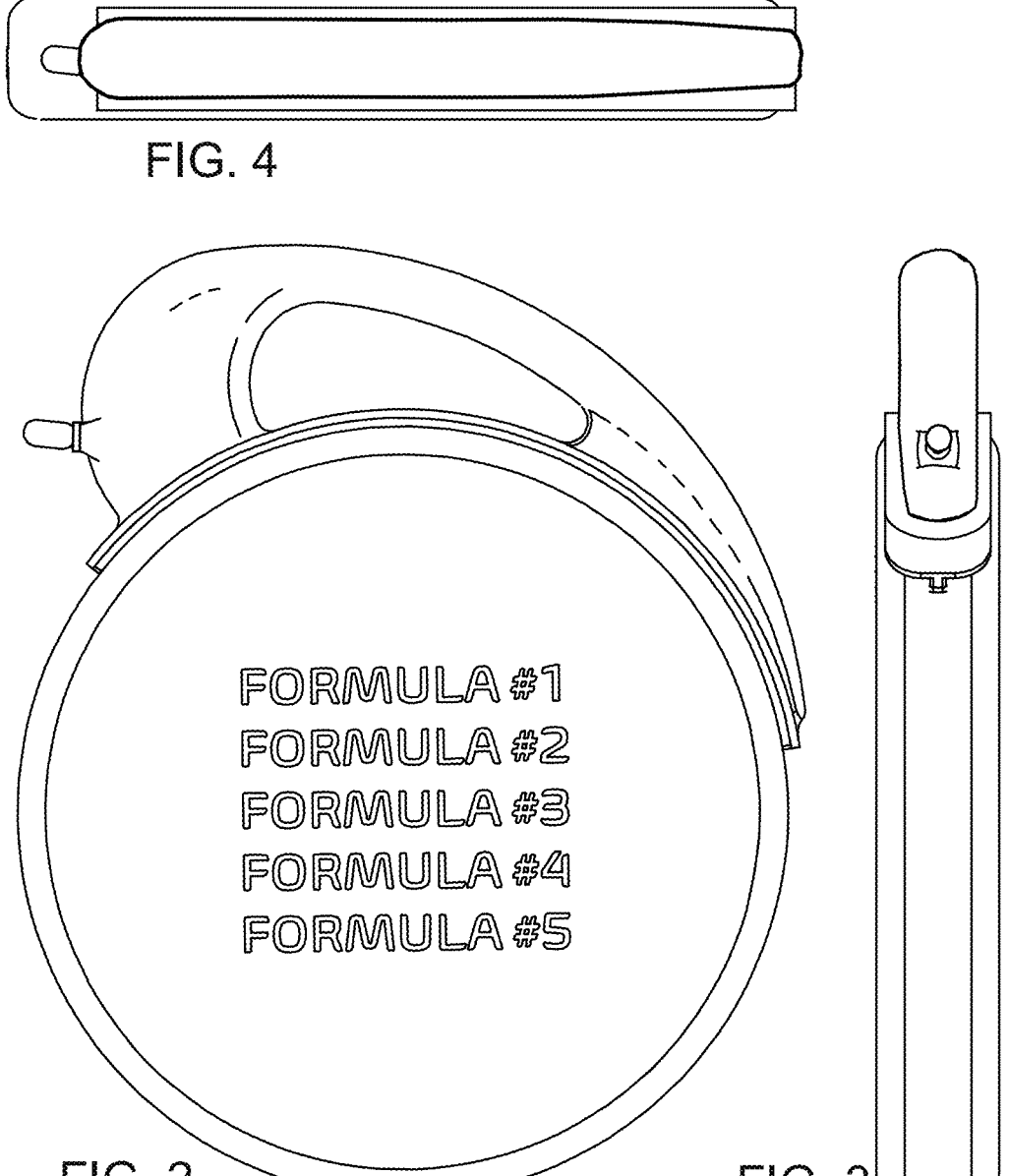
FIG. 2 is a left-side view of the improved fish tape 1000.
FIG. 3 is a front view of the improved fish tape 1000.
FIG. 4 is a top view of the improved fish tape 1000.
Figure 5:
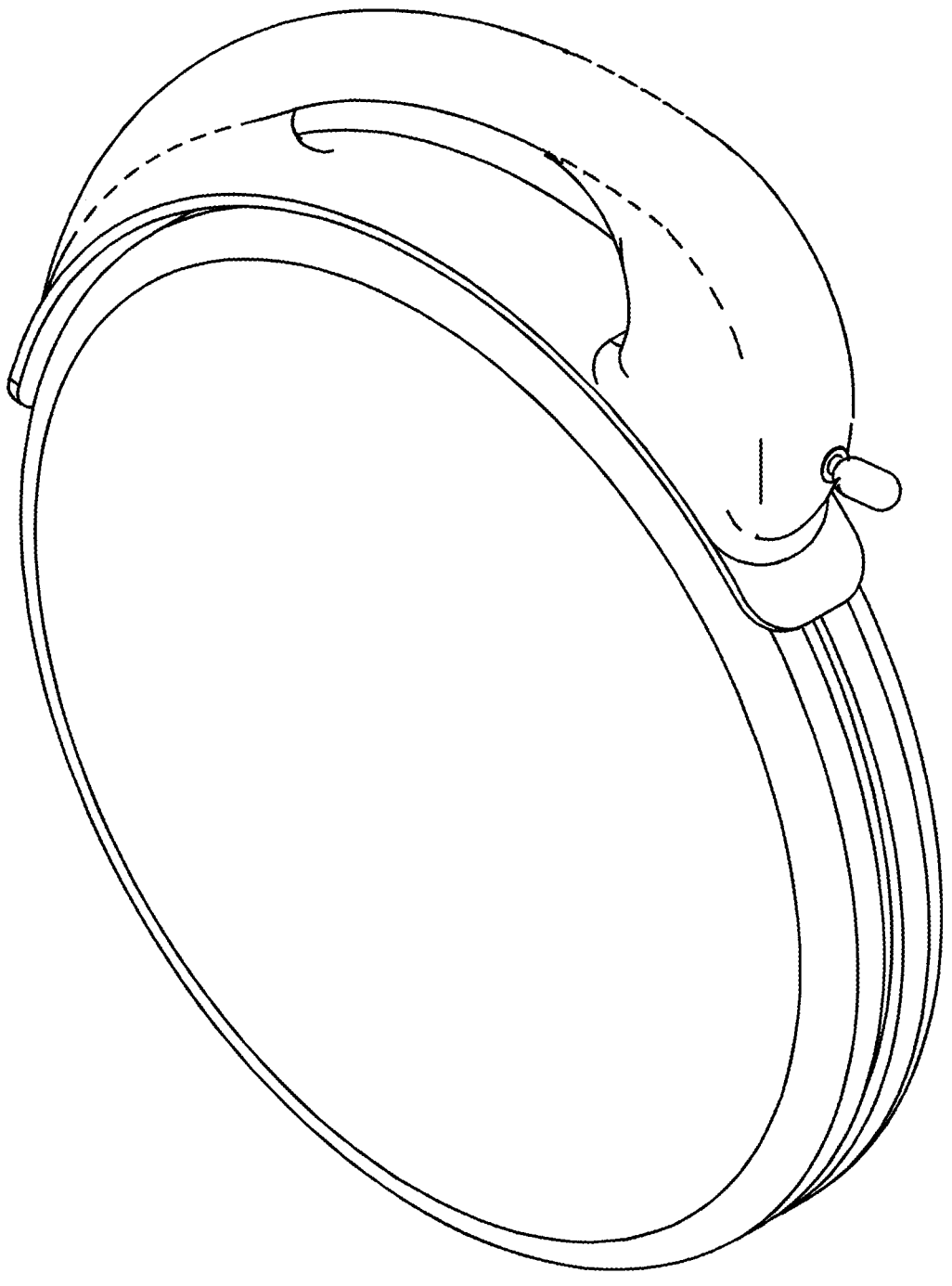
FIG. 5 is another perspective view of the improved fish tape 1000.
Figures 6, 7, 8:
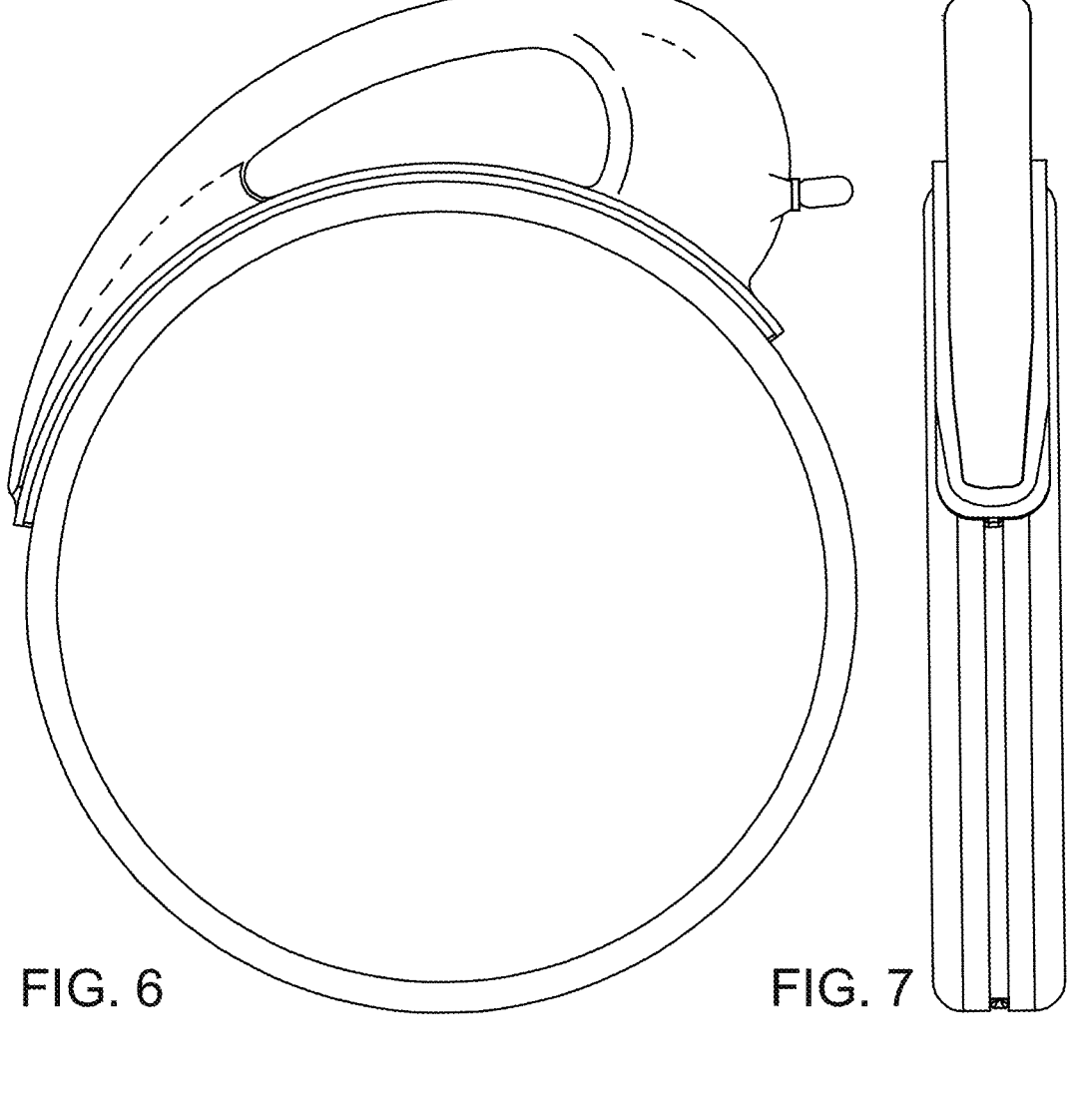
FIG. 6 is a right-side view of the improved fish tape 1000.
FIG. 7 is a back view of the improved fish tape 1000.
FIG. 8 is a bottom view of the improved fish tape 1000.

Using the innovative apparatus of the improved fish tape (1000), as depicted in FIGS. 1 through 8, HVAC technicians and professionals can perform a precise and contamination-free method for measuring and introducing refrigerant into preexisting HVAC systems. FIG. 1 offers a perspective view of the improved fish tape (1000), while FIG. 2 provides a left-side view, emphasizing its components. FIG. 3 showcases the front view, displaying the apparatus's structure, including the modified tape (1200), which houses a scale (1210) for accurate measurement. FIG. 4 presents a top view, giving an overhead perspective of the apparatus, and FIG. 5 provides an additional perspective, highlighting its practicality. FIG. 6 offers a right-side view, further detailing its form and functionality, and FIG. 7 provides a back view, revealing how the tape (1200) enters the housing (1400). The bottom view in FIG. 8 illustrates the apparatus's underside.

FIGS. 1 through 8 are respectively perspective, left-side, front, top, another perspective, right-side, back view and bottom views of an improved fish tape (1000). FIGS. 1 through 8 depict the innovative apparatus of the improved fish tape (1000). This apparatus comprises several key components: the tape (1200), featuring a precision scale (1210) for measuring pipe lengths accurately; a modified tip (1100) engineered to prevent damage to copper piping within refrigerant systems; a housing (1400) that securely contains the tape while allowing for easy extraction; and an integrated squeegee (1300) situated within the housing. The squeegee (1300) serves a critical function, wiping the tape (1200) clean of contaminants as it is extracted from the housing (1400), ensuring measurement accuracy and the integrity of the refrigerant. In one embodiment the squeegee is defined at least in part by an annular or ringed body (e.g. cylindrical with a through hole) through which the tape may electively pass, wherein the through hole is configured with a surface area that interfaces a corresponding surface area on the external surface of the tape such that said surface area of the through hole wipes clean the corresponding surface area on the external surface of the tape whenever the tape electively passes there through said through hole. Furthermore, the housing (1400) includes a face (1410) on which formulas or guidelines for calculating the required refrigerant charge for a system can be etched, enhancing the tool's practicality and convenience for HVAC technicians and other professionals in the field. This innovative apparatus combines practicality, precision, and cleanliness to meet the evolving needs of HVAC maintenance, promising efficient and environmentally responsible system operations.

Figures 9, 10:
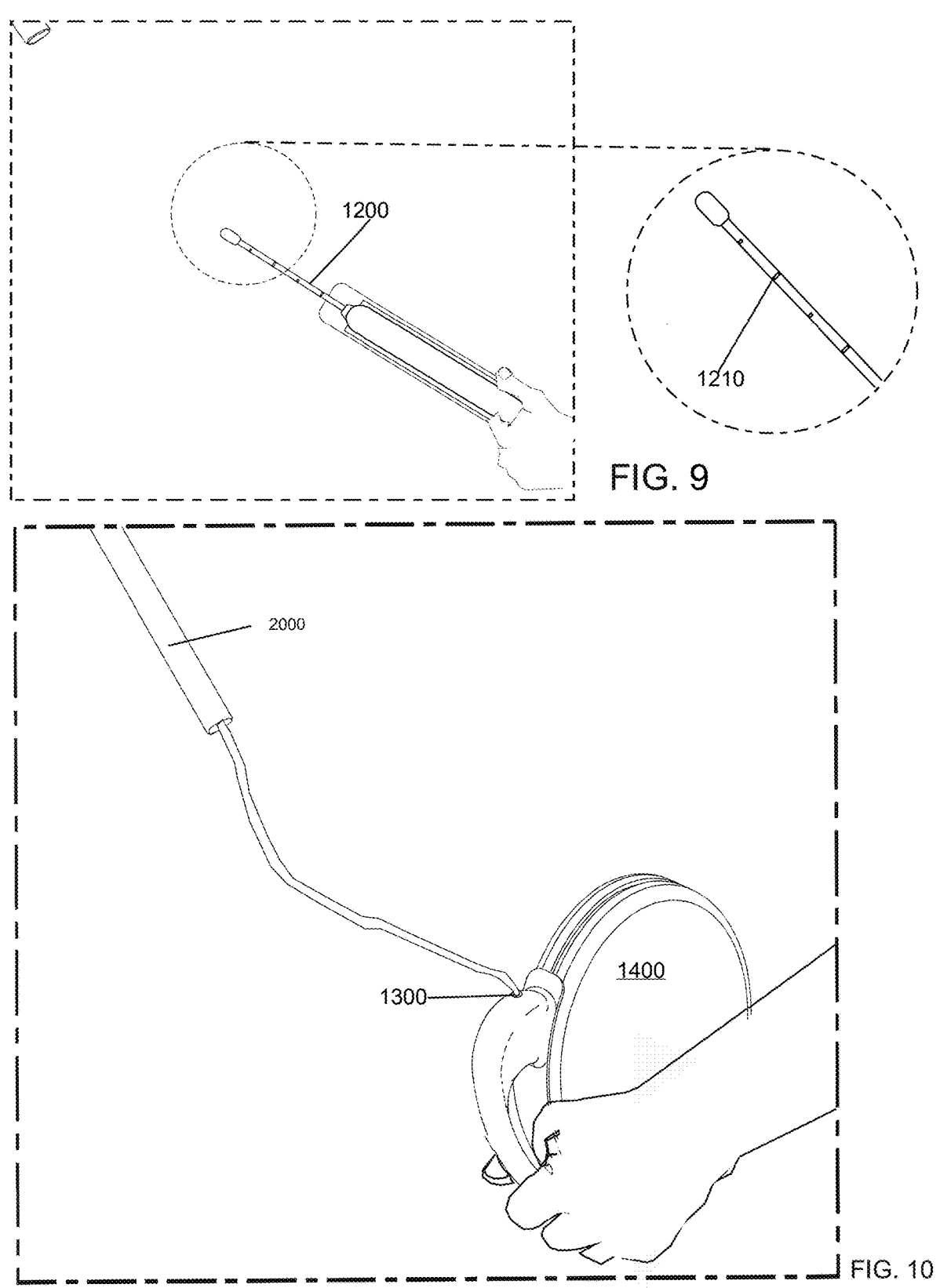
FIG. 9 is an environmental view of the improved fish tape 1000 after the tape 1100 has been squeegeed by the squeegee 1300 during extraction of the tape 1000 from the housing 1400 but before a tip 1100 of the tape 1200 is inserted into a piping system 2000.
FIG. 10 is an environmental view of the improved fish tape 1000 after the tip 1100 has been inserted into the piping system 2000.
Figure 11:
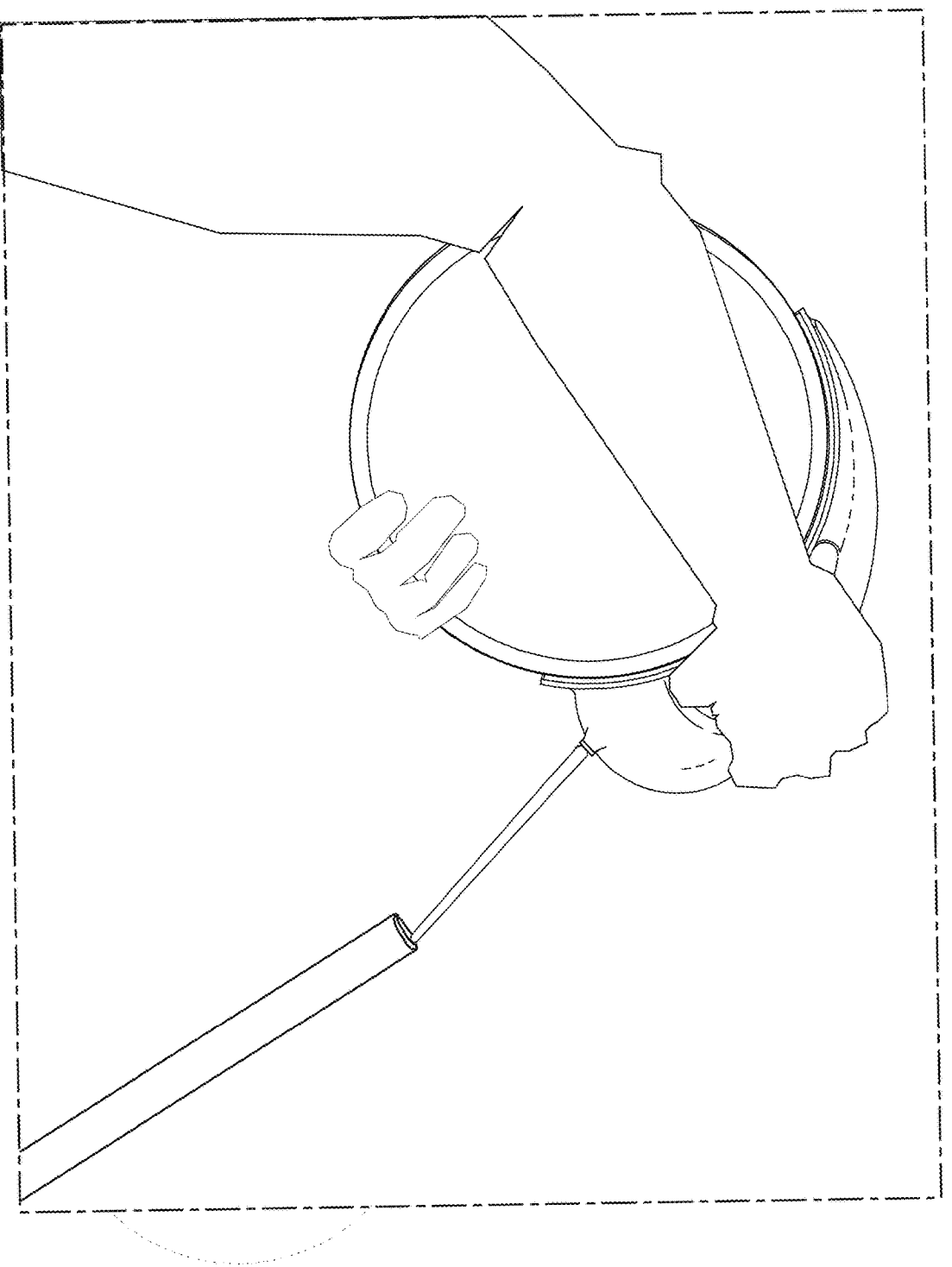
FIG. 11 is an environmental view of the tape 1200 of the improved fish tape 1000 being inserted into the piping system 2000.
Figure 12:
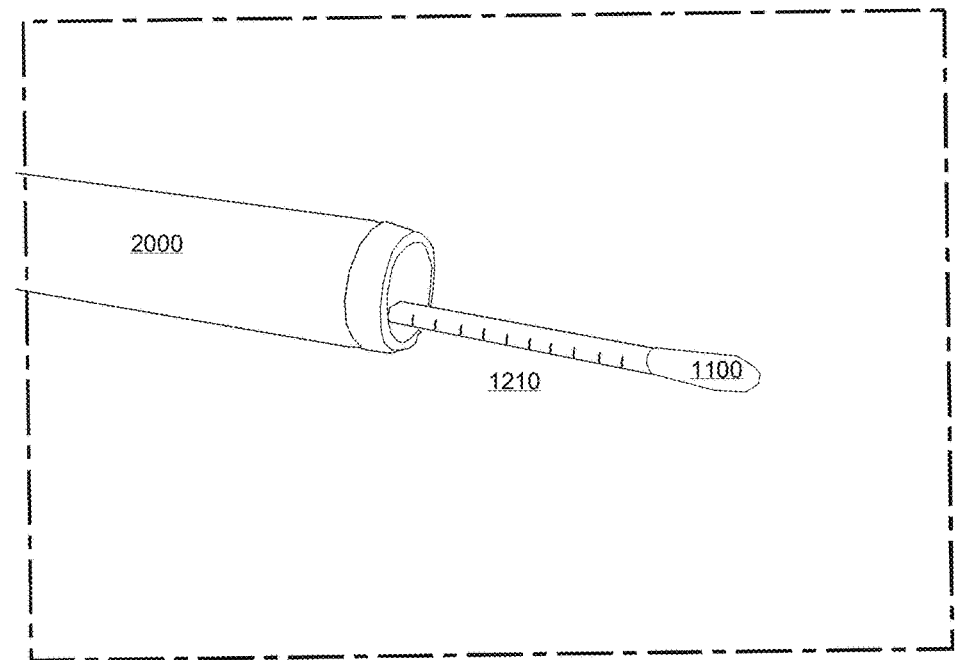
FIG. 12 is a view of the tip 1100 of the improved fish tape 1000 exiting the piping system 2000.
Figure 13:
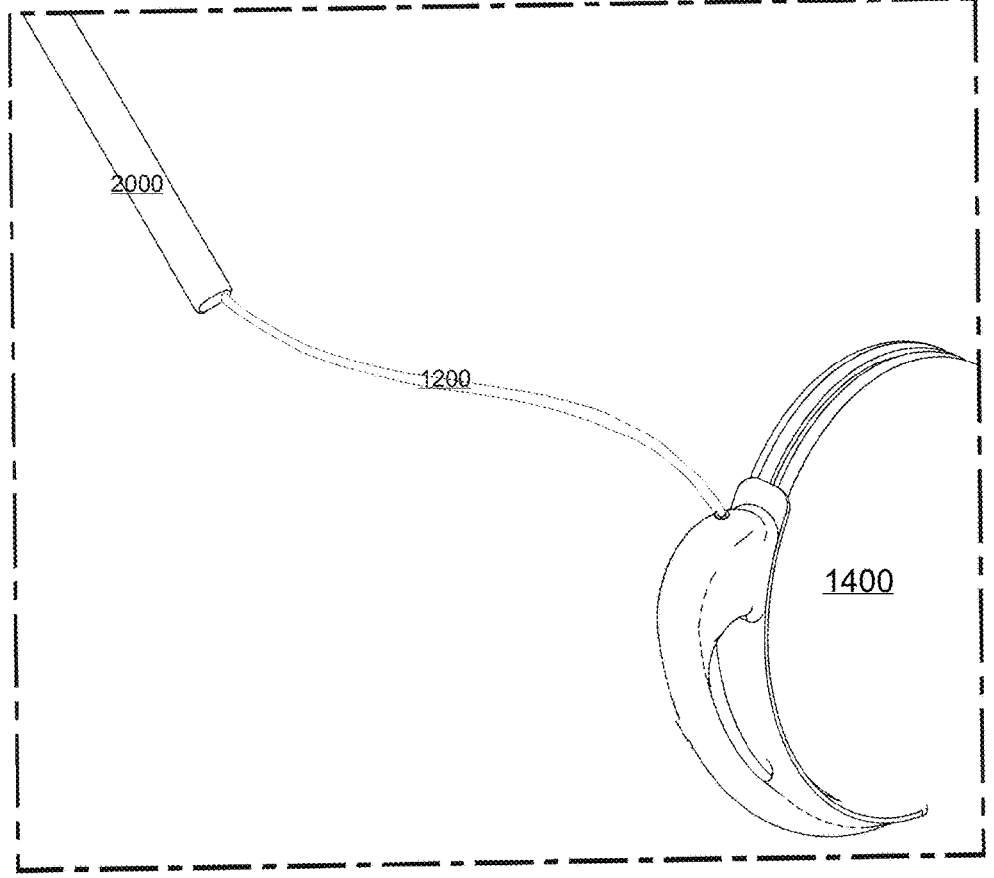
FIG. 13 is an environmental view of the improved fish tape 1000 after being threaded through the piping system 2000; and, FIG. 14 is a view of the scale 1210 of the tape 1200 of the improved fish tape as the scale can be seen at the entry point of the piping system 2000.
Figure 14:
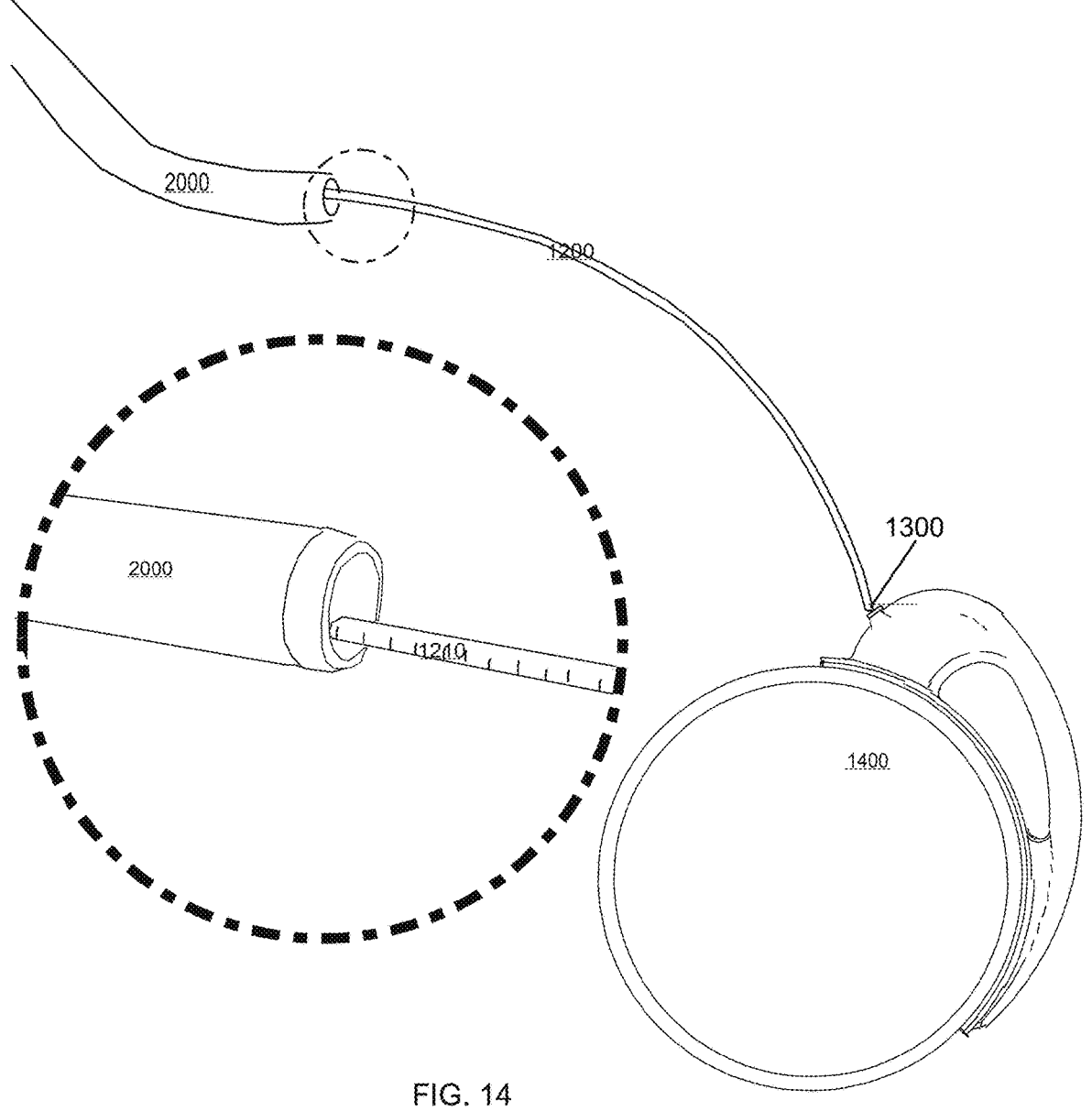

FIGS. 9 through 14 are environmental views of the improved fish tape 1000. The environmental view illustrates a preferred method of using the improved fish tape. Suitably, the preferred method begins by locating the improved fish tape (1000), conveniently stored within the housing (1400), which includes a face (1410) suitable for etching formulas or guidelines for refrigerant calculations. With the tape (1200) and its integrated squeegee (1300) clean and ready, HVAC technicians can proceed to locate the piping system where refrigerant needs to be installed. They can then pull the fish tape from the housing, activating the squeegee (1300) that effectively wipes the tape (1200) clean of contaminants, as seen in FIG. 9. The tip (1100) of the tape is inserted into the piping system (2000), ensuring the pipe remains undamaged, as shown in FIG. 10. Slowly advancing the fish tape into the piping, as demonstrated in FIG. 11, the squeegee (1300) continues to remove any debris or contaminants from the tape's exterior, maintaining cleanliness throughout the process. Upon reaching the end of the piping system, the tape's length, displayed at the entrance of the system as seen in FIG. 14, corresponds to the total system length. This measurement is then noted, and the fish tape is retrieved, as illustrated in FIG. 12. The next steps involve calculating the required refrigerant amount, using formulas or guidelines etched onto the housing's face (1410) if necessary, and charging the system accurately through the appropriate access point. Finally, HVAC technicians can verify and test the system to ensure it operates correctly, meeting desired performance standards, and promoting efficient HVAC system maintenance. After threading through the piping system, as demonstrated in FIG. 13, the tape (1200) provides the accurate measurement needed for precise refrigerant calculations.

Suitably, this method serves as a preferred approach to managing refrigerant quantities, particularly when dealing with older piping systems that lack refrigerant or new systems with known refrigerant levels within the outdoor unit. A primary objective is to break the vacuum within the piping system with precision, ensuring the system operates efficiently. Additionally, it accommodates scenarios where additional refrigerant may be introduced after the vacuum release, often sourced from the outdoor unit while the system remains operational.

For instance, consider one example in which a new R-410A split heat pump system is installed during the winter, featuring 60' of ⅞" vapor line and 60' of ⅜" liquid line. The manufacturer's factory charge of 8 lb 7 oz is designed to cover 15' of each line. Calculations involve deducting the factory charge from the overall line set length. Subsequently, for the ⅜" liquid line, an addition of 0.54 oz per foot, as per the "Refrigerant Weight Per Foot" chart, is necessary. Another example illustrates a similar scenario, where a new R-410A split heat pump system is installed during the winter, featuring 40' of ¾" vapor line and 40' of ⅜" liquid line. The manufacturer's factory charge of 6 lb 5 oz is designed to cover 15' of each line. The calculations involve deducting the factory charge from the actual line set length. Subsequently, for the ⅜" liquid line, an addition of 0.54 oz per foot, as per the "Refrigerant Weight Per Foot" chart, is necessary. A third example also illustrates the system where the example involves an older R-22 packaged unit that experienced a refrigerant leak, resulting in a complete loss of refrigerant. After fixing the leak, conducting a pressure test, and vacuuming the unit, the rating plate specifies a factory charge of 6 lb 5.8 oz. This exact quantity of refrigerant must be introduced as a liquid into the liquid line to break the vacuum. In practice, this method ensures accurate refrigerant volume control, aligning with the unique requirements of various HVAC systems and industry standards, thus ensuring optimal system performance and efficiency.

Although the method and apparatus is described above in terms of various exemplary embodiments and implementations, it should be understood that the various features, aspects, and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. For instance, the squeegee can be put on the entrance of the pipe so that the tape is squeegeed on entrance and extraction from the piping system. Additionally, the squeegee could be replaceable and interchangeable such that a new squeegee can be installed on the housing. Thus, the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more," or the like; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts, and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:

1. A method of using a fish tape and housing comprising:
locating the fish tape wherein the fish tape comprises:
a scaled fiberglass, metal, or plastic tape designed for accurately measuring the total length of round pipes;
a bulbous tip for the tape configured to minimize damage to copper piping of a refrigerant piping system;
the housing containing the tape such that the tape is extractable from the housing; and
a squeegee that wipes clean the tape as it is extracted from the housing;
wherein the squeegee is defined at least in part by a body with a through hole through which the tape may electively pass, wherein the through hole is configured with a surface area that interfaces a corresponding surface area on the external surface of the tape such that said surface area of the through hole wipes clean the corresponding surface area on the external surface of the tape whenever the tape electively passes there through said through hole;
locating the refrigerant piping system;
extracting the fish tape from the housing such that the squeegee wipes the tape clean and free of contaminants;
inserting the tip of the fish tape into a first end of the piping system;
threading the fish tape through the piping system via slowly feeding the fish tape into the refrigerant piping system such that the squeegee continues to remove any debris or contaminants from the exterior surface of the tape as the tape is extracted from the housing and advanced into the refrigerant piping system;
pulling the tip from a second end of the refrigerant piping system;
identifying a scale displayed on the scaled tape at the first end of the piping system such that the scale corresponds to the length of the refrigerant piping system;
noting the length of the refrigerant piping system;
retrieving the fish tape via retraction from the system and reentry of the tape into the housing;
calculating a refrigerant amount based on the length of the refrigerant piping system; and,
charging the system via adding refrigerant in the calculated refrigerant amount to the system; and
verifying or testing a refrigerant system coupled to the refrigerant piping system to ensure that said refrigerant system is operating or that said refrigerant system meets a predetermined performance standard.

2. A method of using the fish tape and housing, the method comprising:
locating the fish tape and housing, where the fish tape and housing comprise—
a scaled fiberglass, metal, or plastic tape designed for accurately measuring the total length of round pipes,
a bulbous tip for the tape configured to minimize damage to copper piping of a refrigerant piping system,
the housing containing the tape such that the tape is extractable from the housing, and
a squeegee that wipes clean the tape as it is extracted from the housing;
locating the refrigerant piping system;
extracting the fish tape from the housing such that the squeegee wipes the tape clean and free of contaminants;
inserting the tip of the fish tape into a first end of the piping system;
threading the fish tape through the piping system via slowly feeding the fish tape into the refrigerant piping system such that the squeegee continues to remove any debris or contaminants from the exterior surface of the tape as the tape is extracted from the housing and advanced into the refrigerant piping system;
pulling the tip from a second end of the refrigerant piping system;
identifying a scale displayed on the scaled tape at the first end of the piping system such that the scale corresponds to the length of the refrigerant piping system;
noting the length of the refrigerant piping system;
retrieving the fish tape via retraction from the system and reentry of the tape into the housing;
calculating a refrigerant amount based on the length of the refrigerant piping system; and,
charging the system via adding refrigerant in the calculated refrigerant amount to the system; and
verifying or testing a refrigerant system coupled to the refrigerant piping system to ensure that said refrigerant system is operating or that said refrigerant system meets a predetermined performance standard.

3. The method of claim 2 wherein the squeegee is defined at least in part by a body with a through hole through which the tape may electively pass, wherein the through hole is configured with a surface area that interfaces a corresponding surface area on the external surface of the tape such that said surface area of the through hole wipes clean the corresponding surface area on the external surface of the tape whenever the tape electively passes there through said through hole.

4. The method of claim 3 wherein the housing features a panel that features printed, embedded material defining at least one formula.

5. The method of claim 3 wherein the squeegee is made of rubber, fiber material, or silicone.

6. The method of claim 5 wherein the body of the squeegee is cylindrical.

7. The method of claim 5 wherein the squeegee is coupled to the housing.

8. The method of claim 5 wherein the squeegee is coupled to the entrance of the refrigerant piping system.

* * * * *